(12) United States Patent
Zhodzishsky et al.

(10) Patent No.: US 7,522,099 B2
(45) Date of Patent: Apr. 21, 2009

(54) POSITION DETERMINATION USING CARRIER PHASE MEASUREMENTS OF SATELLITE SIGNALS

(75) Inventors: Mark I. Zhodzishsky, Moscow (RU); Victor A. Veitsel, Moscow (RU); Alexey Zinoviev, Moscow (RU)

(73) Assignee: Topcon GPS, LLC, Paramus, NJ (US)

( * ) Notice: Subject to any disclaimer, the term of this patent is extended or adjusted under 35 U.S.C. 154(b) by 230 days.

(21) Appl. No.: 11/222,119

(22) Filed: Sep. 8, 2005

(65) Prior Publication Data
US 2007/0052583 A1    Mar. 8, 2007

(51) Int. Cl.
*G01S 1/00* (2006.01)
(52) U.S. Cl. .................................. 342/357.06
(58) Field of Classification Search ................................
342/357.01–357.17, 159–161
See application file for complete search history.

(56) References Cited

U.S. PATENT DOCUMENTS

| | | | | |
|---|---|---|---|---|
| 3,881,096 A * | 4/1975 | Schmidt | ...................... | 701/207 |
| 4,114,155 A * | 9/1978 | Raab | .......................... | 342/394 |
| 4,984,186 A * | 1/1991 | Moerder | .................... | 708/276 |
| 5,266,958 A * | 11/1993 | Durboraw, III | ......... | 342/357.08 |
| 5,519,620 A * | 5/1996 | Talbot et al. | ............... | 701/214 |
| 5,812,087 A * | 9/1998 | Krasner | .................... | 342/357.1 |
| 5,969,669 A * | 10/1999 | Ishikawa et al. | ........ | 342/357.02 |
| 6,104,338 A * | 8/2000 | Krasner | .................. | 342/357.06 |
| 6,263,281 B1 * | 7/2001 | Yamamoto et al. | .......... | 701/215 |
| 6,268,824 B1 * | 7/2001 | Zhodzishky et al. | ... | 342/357.04 |
| 6,313,789 B1 * | 11/2001 | Zhodzishky et al. | .. | 342/357.12 |
| 6,337,657 B1 * | 1/2002 | Zhodzishky et al. | .. | 342/357.02 |
| 6,377,889 B1 * | 4/2002 | Soest | ......................... | 701/207 |
| 6,397,147 B1 | 5/2002 | Whitehead | | |
| 6,456,233 B1 | 9/2002 | Zhodzishky et al. | | |
| 6,469,663 B1 | 10/2002 | Whitehead et al. | | |
| 6,861,979 B1 * | 3/2005 | Zhodzishky et al. | .. | 342/357.03 |
| 6,922,635 B2 * | 7/2005 | Rorabaugh | .................. | 701/213 |

(Continued)

OTHER PUBLICATIONS

K. Dost, "Going the Distance—A GPS Solution for TSD Rallies", GPS World, Jun. 1, 2004.

(Continued)

*Primary Examiner*—Thomas H Tarcza
*Assistant Examiner*—Nga X Nguyen
(74) *Attorney, Agent, or Firm*—Wolff & Samson PC

(57) ABSTRACT

Disclosed is a method and apparatus for determining the relative position of a mobile unit that moves from an initial location to a plurality of successive positions. The mobile unit receives signals from a plurality of navigation satellites and tracks the carrier phases of the signals during movement. For each of the received signals, carrier phase increments are calculated over a plurality of epochs. Anomalous carrier phase increments are determined and eliminated from further calculations. The non-eliminated carrier phase increments are then used to calculate coordinate increments for each of the time epochs. If, after elimination, the remaining number of carrier-phase increments is less than a threshold for a particular epoch, then coordinate increments for the particular epoch may be extrapolated using data from prior epochs. In various embodiments, least squares method and Kalman filtering may be used to calculate the coordinate increments. The coordinate increments may then be summed over a plurality of time epochs in order to determine a position of the mobile unit relative to its initial position.

33 Claims, 6 Drawing Sheets

U.S. PATENT DOCUMENTS

| | | | |
|---|---|---|---|
| 7,221,314 B2 * | 5/2007 | Brabec et al. | 342/357.04 |
| 7,222,035 B1 * | 5/2007 | Zhodzishsky et al. | 702/75 |
| 2002/0061055 A1 * | 5/2002 | Yule et al. | 375/149 |
| 2003/0085839 A1 * | 5/2003 | Zhodzishky et al. | 342/357.12 |
| 2004/0130485 A1 * | 7/2004 | Rapoport et al. | 342/357.03 |

OTHER PUBLICATIONS

Hatch, et al., "An Innovative Algorithm for Carrier-Phase Navigation", ION GNSS 17th International Technical Metting of the Satellite Div., Sep. 21-24, 2004, Long Beach, CA.

* cited by examiner

POSITION DETERMINATION USING CARRIER PHASE MEASUREMENTS OF SATELLITE SIGNALS

BACKGROUND OF THE INVENTION

The present invention relates generally to position determination using satellite signals, and more particularly to relative position determination using carrier phase measurements of satellite signals.

Satellite positioning systems, such as GPS (USA) and GLONASS (Russia), are well known in the art and are intended for highly accurate self-positioning of users possessing special navigation receivers. A navigation receiver receives and processes radio signals transmitted by satellites located within line-of-sight distance of the receivers. The satellite signals comprise carrier signals that are modulated by pseudo-random binary codes. The receiver measures the time delay of the received signal relative to a local reference clock or oscillator. These measurements enable the receiver to determine the so-called pseudo-ranges between the receiver and the satellites. The pseudo-ranges are different from the ranges (distances) between the receiver and the satellites due to various noise sources and variations in the time scales of the satellites and receiver. If the number of satellites is large enough, then the measured pseudo-ranges can be processed to determine the user location and coordinate time scales. This type of system uses a single satellite receiver and is referred to herein as a stand alone system. These stand alone systems provider meter-level accuracy.

The requirement of accurately determining user location with a high degree of precision, and the desire to improve the stability and reliability of measurements, have led to the development of differential navigation (DN). In differential navigation, the task of finding the user position, also called the Rover, is performed relative to a Base station (Base). The precise coordinates of the Base station are known and the Base station is generally stationary during measurements. The Base station has a navigation receiver which receives and processes the signals of the satellites to generate measurements. These signal measurements are transmitted to the Rover via a communication channel (e.g., wireless). The Rover uses these measurements received from the Base, along with its own measurements taken with its own navigation receiver, in order to precisely determine its location. The location determination is improved in the differential navigation mode because the Rover is able to use the Base station measurements in order to compensate for the major part of the strongly correlated errors in the Rover measurements.

Various modes of operation are possible while using differential navigation. In post-processing (PP) mode, the Rover's coordinates are determined by co-processing the Base and Rover measurements after all measurements have been completed. This allows for highly accurate location determination because more data is available for the location determination. In real-time processing (RTP) mode, the Rover's coordinates are determined in real time upon receipt of the Base station information received via the communication channel.

The location determination accuracy of differential navigation may be further improved by supplementing the pseudo-range measurements with measurements of the phases of the satellite carrier signals. If the carrier phase of the signal received from a satellite in the Base receiver is measured and compared to the carrier phase of the same satellite measured in the Rover receiver, measurement accuracy may be obtained to within several percent of the carrier's wavelength. Real-time carrier signal based differential navigation is often referred to as real-time kinematic (RTK). The practical implementation of these advantages, which might otherwise be guaranteed by the measurement of the carrier phases, runs into the problem of ambiguity resolution for phase measurements.

The ambiguities are caused by two factors. First, the difference of distances from any satellite to the Base and Rover is usually much greater than the carrier's wavelength. Therefore, the difference in the phase delays of a carrier signal received by the Base and Rover receivers may substantially exceed one cycle. Second, it is not possible to measure the integer number of cycles from the incoming satellite signals; one can only measure the fractional part. Therefore, it is necessary to determine the integer number of cycles, which is called the "ambiguity". More precisely, we need to determine the set of all such integer parts for all the satellites being tracked, one integer part for each satellite. One has to determine this set along with other unknown values, which include the Rover's coordinates and the variations in the time scales.

At a high level, the task of generating highly-accurate navigation measurements is formulated as follows: it is necessary to determine the state vector of a system, with the vector containing $n_\Sigma$ unknown components. Those include three Rover coordinates (usually along Cartesian axes X, Y, Z) in a given coordinate system (sometimes time derivatives of coordinates are added too); the variations of the time scales which is caused by the phase drift of the local main reference oscillator in the receiver; and n integer unknown values associated with the ambiguities of the phase measurements of the carrier frequencies. The value of n is determined by the number of different carrier signals being processed, and accordingly coincides with the number of satellite channels actively functioning in the receiver. At least one satellite channel is used for each satellite whose broadcast signals are being received and processed by the receiver. Some satellites broadcast more than one code-modulated carrier signal, such as a GPS satellite which broadcasts a carrier in the L1 frequency band and a carrier in the L2 frequency band. If the receiver processes the carrier signals in both of the L1 and L2 bands, a so-called dual-frequency receiver, the number of satellite channels (n) increases correspondingly. Dual-frequency receivers allow for ionosphere delay correction an make ambiguity resolution easier.

Two sets of navigation parameters are measured by the Base and Rover receivers, respectively, and are used to determine the unknown state vector. Each set of parameters includes the pseudo-range of each satellite to the receiver, and the full (complete) phase of each satellite carrier signal. Each pseudo-range is obtained by measuring the time delay of a code modulation signal of the corresponding satellite. The code modulation signal is tracked by a delay-lock loop (DLL) circuit in each satellite tracking channel. The full phase of a satellite's carrier signal is tracked by a phase-lock-loop (PLL) in the corresponding satellite tracking channel. An observation vector is generated as the collection of the measured navigation parameters for specific (definite) moments of time.

The relationship between the state vector and the observation vector is defined by a well-known system of navigation equations. Given an observation vector, the system of equations may be solved to find the state vector if the number of equations equals or exceeds the number of unknowns in the state vector. Conventional statistical methods are used to solve the system of equations: the least squares method, the method of dynamic Kalman filtering, and various modifications of these methods.

Practical implementations of these methods in digital form may vary widely. In implementing or developing such a method on a processor, one usually must find a compromise between the accuracy of the results and speed of obtaining results for a given amount of processor capability, while not exceeding a certain amount of loading on the processor.

One general scheme comprises the following steps. The measured values of the pseudo-ranges and full phases at specific (definite) moments of time, along with an indication of the satellites to which these measurements belong and the time moments of the measurements, are transmitted from the Base to the Rover. Corresponding values are measured in the Rover receiver. The processing includes the determination of the single differences of the pseudo-ranges and full phases between the Base and Rover measurements for each satellite. The strongly correlated errors are compensated (i.e., substantially cancelled) in the single differences. Then, the residuals of the single differences are calculated by subtraction of calculated values from the measured results. The processing of residuals allows one to linearize the initial system of navigation equations (sometimes several subsequent iterations are necessary), which makes possible the use of the well developed body of mathematics for solving systems of linear equations. The components of the state vector, with the n ambiguities included, are found as a result of the solution. But the calculated values of the ambiguities are not necessarily integer numbers. Because of this, they are called float ambiguities, or floating ambiguities, at this stage of the solution. To find true values of the integer ambiguities one uses the procedure of rounding off the float ambiguity vector to the nearest set of integers. This process is called the ambiguity resolution. Only after the ambiguity resolution has been done is it possible to determine the true values of residuals and then, by solving the system of equations again, to find the coordinate values for the baseline connecting the Base and Rover, and consequently to determine the exact coordinates of the Rover and the correction to its clock drift.

The above described general scheme of computations is well known in the art and is described in further detail, for example, in, Bradford W. Parkinson and James J. Spilker Jr., Global Positioning Theory and Applications, Volume 163 of Progress In Astronautics and Aeronautics, published by the American Institute of Aeronautics and Astronautics, Inc, Washington D.C., 1996.

In most cases the Rover receiver operates in a complicated environment in which various external influences cause measurement errors. For example, external signals may interfere with the satellite signals, and structures and terrain may result in multipath errors. We distinguish now between two types of errors, normal errors and abnormal errors. Normal errors are normally distributed white noise errors which may be compensated for during the location calculation. Abnormal errors are large systematic errors which may prevent the system from calculating an accurate location. Such abnormal errors are rarely a consequence of occasional spikes of intrinsic noise. More often, they are the result of severe exposure of the receiver. For example, strong reflected signals that interfere with the direct satellite signal would cause an abnormal error. Similarly, extreme radio interference may also result in abnormal errors. Partial or complete shading of the Rover receiver may also result in errors due to radio wave diffraction. If the shading is partial and minor, the measurement error may be minimal. However, if a satellite is completely shaded (i.e., blocked), all that remains is the multipath signal. As a result, tracking in the channel is interrupted and the measured phase is lost resulting in an abnormal error. Dynamic effects on the receiver (i.e., certain motion of the Rover) may also cause abnormal errors. Impulse accelerations impact both the receiving antenna and the quartz of the local reference oscillator resulting in drift of the intermediate carrier frequency and measured phase.

One specific type of abnormal error is a PLL cycle slip which is a cycle slip in the PLL circuits which are tracking the satellite carrier signal. After a cycle slip occurs, the PLL circuit transits to a new point of steady balance, after which it goes on with tracking the satellite carrier signal. As a result of a cycle slip, an abnormal error equal to several integer number of semi-cycles (half-cycles) is introduced into the full phase measurements. A cycle slip is characterized by two parameters, value and duration. The slip's value (in cycles) is determined by either 0.5K or K dependent on the PLL discriminator's type, where K is a random integer number. The duration of the cycle slip is also random. Minimal duration is defined by the PLL band while maximal duration depends upon the cause bringing about the cycle slip and can last up to several seconds. When the duration is long enough, tracking is lost.

There are various known techniques for detecting and correcting for cycle slip. For example, U.S. Pat. No. 5,502,641 discloses a method of detecting and correcting cycle slips caused by short-term blocking of satellite signals using phase extrapolation. In addition, S. Bisnath, D. Kim, and R. B. Langley, A new Approach to an Old Problem: Carrier-Phase Cycle Slips, GPS World, Vol. 12, No. 5 (2001), pp. 46-51, discloses a technique of post-processing the recorded code and phase measurements at two frequencies (the L1 and L2 bands) and detecting cycle slips based on the spikes of time derivatives in the corresponding combinations of the recorded measurements.

Normal errors are caused by intrinsic receiver noise and comparatively weak signals reflected from local objects. In addition, normal errors may result from additional delays in radio waves propagating through the atmosphere, inaccurate knowledge of satellite trajectory, and drift of a satellite's onboard clock.

Much of the advancements in satellite positioning has been directed to suppressing various types of errors. Differential navigation, for example, mitigates errors caused by the atmosphere, inaccurate knowledge of satellite trajectory, and the drift of a satellite's onboard clock. Other techniques have been developed to reduce the influence of abnormal errors. These techniques detect and eliminate incorrect and inaccurate measurements (for example when the parameters of received signals are deteriorated by heavy interference).

When considering the use of the above technologies, there is a trade-off between accuracy and cost. The most accurate technique is RTK, which can generally provide centimeter-level accuracy. However, this mode of operation requires a Rover and Base station both having a dual-frequency receiver, a radio for communicating corrections from the Base to the Rover via a communication link, and an algorithm for solving the ambiguities of the carrier phase measurements. Thus, while providing accurate positioning results, this mode of operation is also the most expensive, in terms of equipment cost, processing power, and complexity.

Alternatively, the least accurate technique is the stand alone system described above, which provides only meter-level accuracy. While less accurate, this type of system is also the least expensive and least complex, as it requires only a single satellite receiver and no base station.

Various techniques exist for improving the accuracy of satellite positioning systems. For example, U.S. Pat. No. 6,397,147 discloses a technique for determining the relative position between two points, in real-time, using a single GPS receiver that makes measurements of signals transmitted from GPS satellites. That patent discloses a technique where differential correction terms are computed as a location at an instant of time, and then applied to further times, so that the position of the GPS receiver is determined accurately relative to the position at the original instant of time. In the technique of '147 patent, a single receiver acts both as the reference base station, producing the original set of differential correction terms, and then as the rover receiver using that set of differential correction terms to accurately determine the location of the rover.

Another technique for improving the accuracy of satellite positioning systems is disclosed in R. Hatch, R. Sharpe, and Y. Yang, *An Innovative Algorithm for Carrier-Phase Navigation*, ION GNSS 17th International Technical Meeting of the Satellite Division, 21-24 Sep. 2004, Long Beach, Calif. This technique uses the change in the carrier-phase measurements to propagate the position and clock states forward in time with a minimum of computational burden. Specifically, rather than treat the change in the phase measurements as range difference measurements, they are treated as range error measurements. One stated limitation of this technique is that it can provide accurate positioning measurements over only relatively short time intervals (e.g., 10-30 seconds).

BRIEF SUMMARY OF THE INVENTION

The present invention is a new technique which provides improved relative position determination accuracy, without the cost and complexity of RTK systems. In accordance with an embodiment of the invention, the relative position of a mobile unit that moves from an initial location to a plurality of successive positions may be determined. The mobile unit receives signals from a plurality of navigation satellites, and tracks the carrier phases of the signals during movement. For each of the received signals, carrier phase increments are calculated over a plurality of epochs. Anomalous carrier phase increments are determined and eliminated from further calculations. The non-eliminated carrier phase increments are then used to calculate coordinate increments for each of the time epochs. If, after elimination, the remaining number of carrier-phase increments is less than a threshold for a particular epoch, then coordinate increments for the particular epoch may be extrapolated using data from prior epochs. In various embodiments, least squares method and Kalman filtering may be used to calculate the coordinate increments. The coordinate increments may then be summed over a plurality of time epochs in order to determine a position of the mobile unit relative to its initial position.

Various embodiments utilize various techniques for determining which of the carrier phase increments are anomalous. In one embodiment, residuals of carrier phase increments are calculated, and these residuals are compared to a threshold. If the residual of at least one of the satellite channels is greater than a threshold, then the carrier phase increment associated with the satellite channel having the maximum residual is considered anomalous. In an alternate embodiment, a sum of residuals squares is calculated from the residuals and this sum is compared to a threshold. If the sum is greater than a threshold, then the carrier phase increment associated with the satellite channel having the maximum residual is considered anomalous. Upon a determination of maximum residual as described above, a channel weight for the satellite associated with the maximum residual may be set to zero so as to remove the anomalous signals from further computations. In a particular embodiment, the channel weight may be set to zero for two consecutive epochs.

In yet other embodiments, carrier phase increments may be determined to be anomalous based on detecting a large difference between carrier phase increments for neighboring epochs or by alarm signals of satellite channel indicators.

If the mobile unit traverses a closed loop during a motion interval, then an error of calculated coordinate increments may be calculated by determining a starting position and a finishing position of the mobile unit, and calculating the difference between the finishing position and stating position. The difference may be used as an error of calculated coordinate increments. In a particular embodiment, the difference is divided by a number of elapsed epochs to determine an average error of coordinate increments, and the average error of coordinate increments is used as the correction for measured coordinate increments during the motion interval.

These and other advantages of the invention will be apparent to those of ordinary skill in the art by reference to the following detailed description and the accompanying drawings.

DETAILED DESCRIPTION

In certain positioning applications, it is unnecessary to determine the absolute location of a moving rover receiver. Instead, what is required is an accurate determination of the position of the rover relative to some fixed point on the ground. The present invention is a novel technique for processing measurements of a navigation receiver in order to provide coordinates of a moving rover receiver using a local coordinate system having an initial point of origin fixed to a random point on the ground. It is unnecessary to know the absolute coordinates of this initial point, and the present invention will provide accurate positions relative to the initial point.

Figure 1:
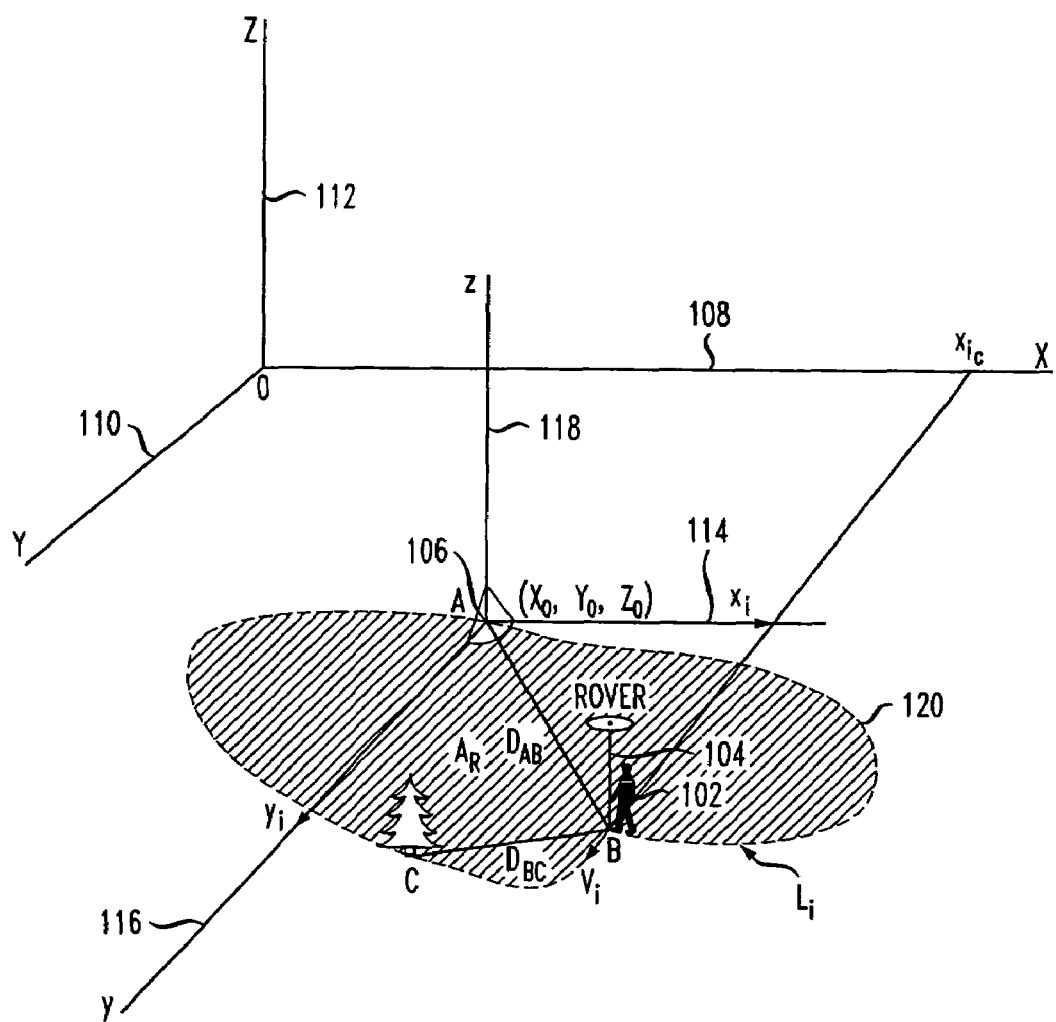
FIG. 1 illustrates the use of a rover satellite receiver in order to determine a position relative to a fixed point.

FIG. 1 illustrates the use of a rover satellite receiver in order to determine a position relative to a fixed point. FIG. 1 shows a user 102 utilizing a single receiver stand-alone rover satellite receiver 104. Also shown in FIG. 1 is an absolute coordinate system having an X axis 108, Y axis 110, and Z axis 112. For example, the absolute coordinate system X, Y, Z may be based on the Cartesian coordinate system. FIG. 1 also shows a local coordinate system having an x axis 114, y axis 116, and z axis 118, having an origin at a point A 106. Knowledge of the absolute coordinates of point A 106 is not required. All that is required is that point A 106 is an initial starting point of rover 104, and point A 106 should be marked on the ground with some type of identifiable marker.

The rover 104 starts at the initial point A 106 and moves in a random trajectory 120. The present invention provides a method for accurately determining the location of the rover 104 relative to point A 106 (i.e., relative coordinates x,y,z). (Of course, if the absolute coordinates of point A are accurately known, then the absolute coordinates of the rover may be determined as well.)

The technique in accordance with the present invention will now be described at a high level, with further details of the present invention to be described further below. For each satellite in the observed constellation, the rover 104 satellite receiver generates pseudorange and full carrier phase measurements for each of multiple discrete time intervals, called epochs. Messages with information about satellite coordinates, predicted ionosphere parameters (ionosphere induced delay), satellite health and other data are also generated.

The rover 104 processes the full phase and pseudorange measurements, applying corrections for troposphere offset and ionosphere induced delay obtained from the information messages. The full phase measurements enable the rover to evaluate increments of ranges to satellites over an epoch, which increments depend on the velocity of satellites relative to the rover. These increments may be referred to herein as increments of radial ranges to satellites. Processing these increments with the least squares method (LSM) (or Kalman filtering) results in three components of corresponding increments of the rover's coordinates per epoch in the Cartesian coordinate system. An indicator of anomalies detects those epochs during which abnormal errors in full phase measurements took place and the LSM processing is repeated while eliminating the anomalous measurements from the LSM computation. The rover's coordinate increments are summed up over multiple epochs in order to determine the rover local coordinates. It is noted that such summing of coordinate increments does not cause a monotonic increase in the variance of errors in local coordinates as these increments are strongly correlated for successive epochs.

Referring again to FIG. 1, processing in accordance with the present invention allows for determination of a rover's local coordinates relative to an initial starting point A 106. In addition, the length of the path Li traversed by the rover, the distance between two points $D_{AB}$ or $D_{BC}$ traversed by the rover, and the area enclosed by the trajectory $A_R$ may also be determined.

Figure 2:
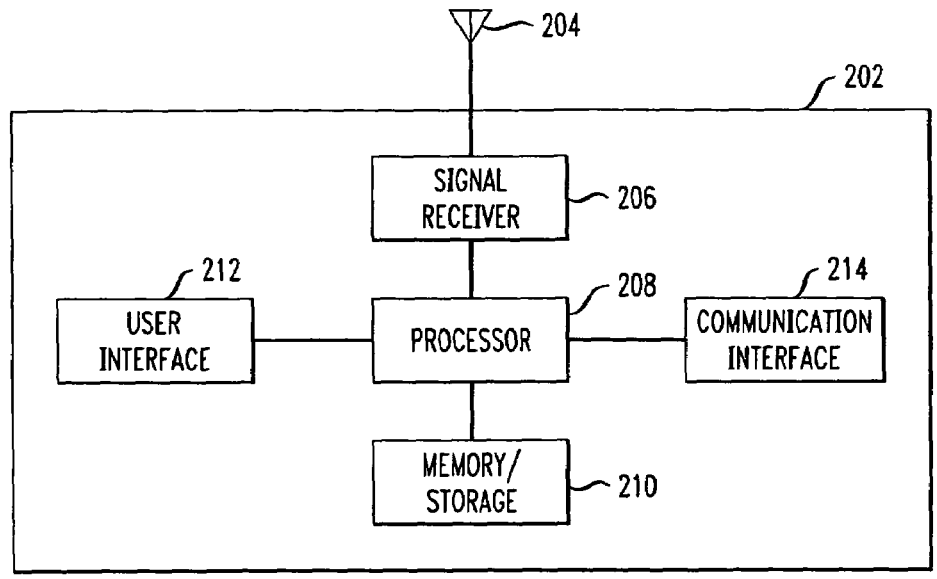
FIG. 2 is a high level block diagram of the components of a rover navigation unit.

A high level block diagram of the components of a rover navigation unit 202 is shown in FIG. 2. The rover navigation unit 202 includes an antenna 204 for receiving satellite signals from a constellation of visible navigation satellites. The signals are processed by a signal receiver 206 and the output of the signal receiver 206 may be provided to a processor 208 for further processing. The rover navigation unit 202 also includes a communication interface 214 for communicating with other devices via a communication channel. Rover navigation unit 202 may also contain user interface 212 elements (e.g., keypad, display, etc.) in order to allow interaction with a user of the rover navigation unit 202. The processor 208 controls the overall functioning of the rover navigation unit under the control of computer program instructions stored in memory/storage 210. It is to be understood that FIG. 2 is meant to show a high level functional block diagram of a rover navigation unit for purposes of illustrating the principles of the present invention. There are, of course, other elements not shown which would be present in a rover navigation unit. Given the description herein, one skilled in the art would readily understand how to modify a well known rover navigation unit in order to implement the principles of the present invention.

Prior to describing the functioning of a rover receiver in accordance with the principles of the present invention, a description of the notation used herein will be provided. Such notation is as follows.

j is the satellite number in the constellation of N satellites;

i is the epoch number from the beginning of observation;

$X_i[j], Y_i[j], Z_i[j]$ are satellites' Cartesian coordinates in the geocentric coordinate system.

$dX_i[j], dY_i[j], dZ_i[j]$ are the increments of Cartesian coordinates from (i−1)th to i-th epochs;

$x_{ic}, y_{ic}, z_{ic}$ are the rover's Cartesian coordinates that are obtained from processing pseudoranges (by code measurements) in geocentric coordinate system (rover's code coordinates);

$R_i[j], R_{i-1}[j]$ are satellite ranges for i-th and (i−1)-th epochs;

$\phi_i[j]$ are satellites' full phases transmitted on the carrier frequency;

$d\Phi_i[j]$ are the carrier-phase increments (i.e., increments of radial ranges to satellites expressed in meters) measured by phases from (i−1)-th to i-th epochs;

$dx_i, dy_i, dz_i$ are the increments of rover's Cartesian coordinates from (i−1)-th to i-th epochs, which are obtained by phase measurements; and $x_i, y_i, z_i$ are the rover's local coordinates obtained from phase measurements.

Figure 3:
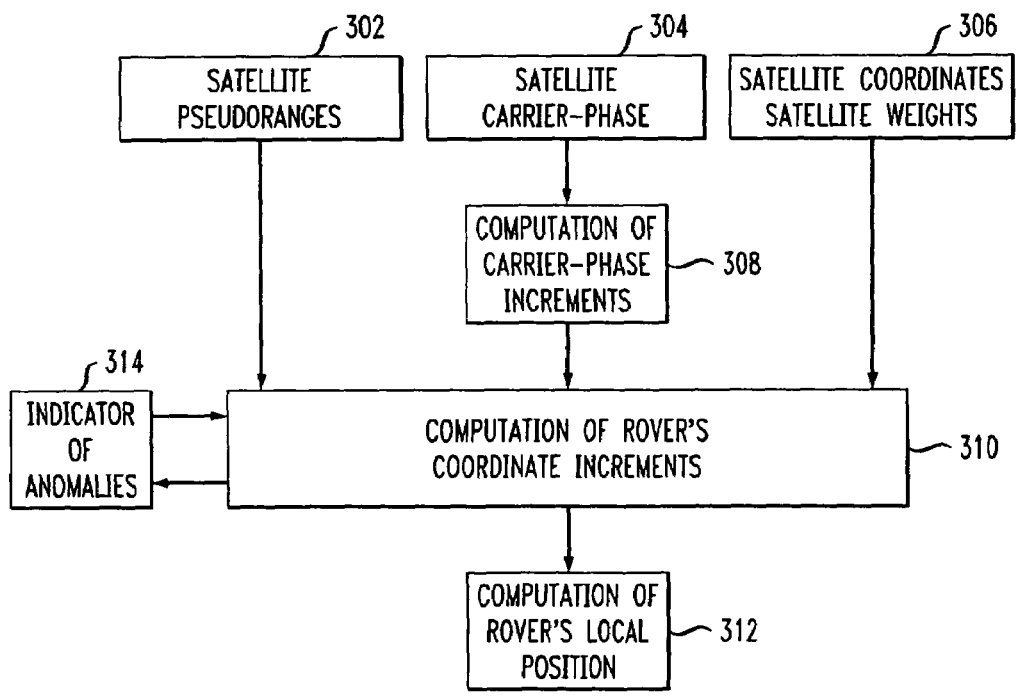
FIG. 3 shows a high level functional block diagram illustrating an overview of processing in accordance with an embodiment.

FIG. 3 shows a high level functional block diagram illustrating an overview of processing in accordance with an embodiment of the present invention. Further details of this processing, in accordance with an embodiment of the invention, are described below in conjunction with FIGS. 4-7. Referring to FIG. 3, block 302 represents satellite pseudoranges, which were obtained by satellite code delays. Block 304 represents satellite carrier-phases for all visible satellites. Block 306 represents satellite information messages containing information about satellite coordinates, weight coefficients, and radio wave propagation delays. Carrier-phase increments over a short time interval (epoch) are derived from the carrier phases 304, and in processing block 308 these values are re-calculated in terms of length units based on the wavelength of the carrier signal. In processing block 314, measurements with environmentally-induced abnormal errors (errors which were caused by external effects on the receiver) are detected and eliminated from further processing, using a set of different indications characterizing the signal quality, the redundancy of observed satellite number, and the rover's motion pattern. In processing block 310 the rover's coordinate increments (also in length units) are determined using the information obtained in processing block 314. The operation in processing block 310 may be performed using various techniques. Advantageous techniques include LSM and Kalman filtering. Processing blocks 314 and 310 work together by successive approximations in which all the abnormal measurements are gradually eliminated while rover coordinate increments are made more precise. Processing block 312 determines local rover coordinates, which may be used for various geodetic purposes. Further details of the processing described in connection with FIG. 3 is described below in connection with an embodiment of the invention which utilizes LSM.

Figure 4:
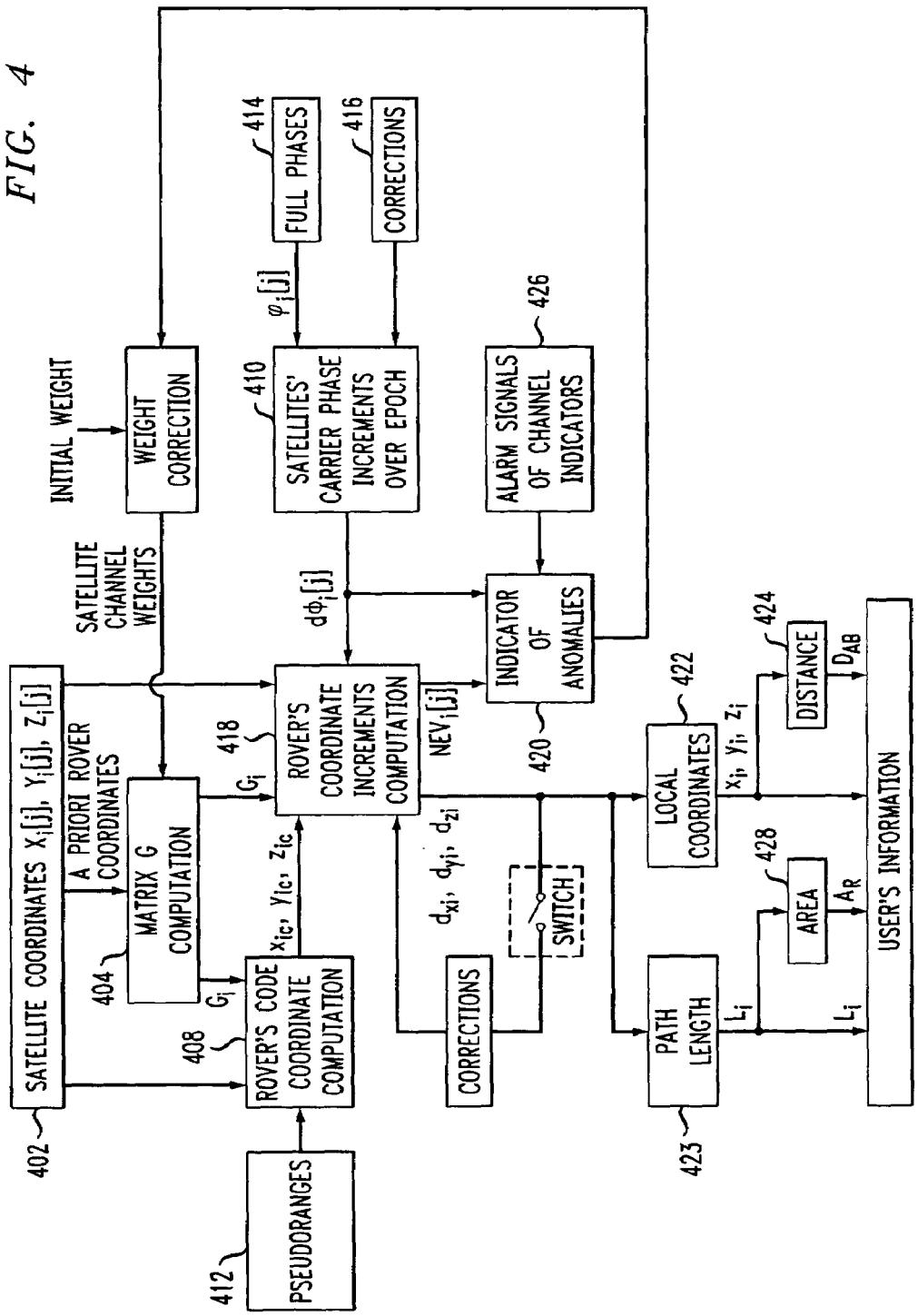
FIG. 4 shows a functional block diagram illustrating the algorithm for determining a rover navigation unit's local coordinates in accordance with one embodiment.

FIG. 4 shows a functional block diagram illustrating the algorithm for determining the rover's local coordinates in accordance with one embodiment of the invention. It is noted that functional block diagrams (e.g., FIGS. 4 & 5) herein are meant to describe high level functioning. One skilled in the art would readily recognize that some of the blocks represent input parameters, others represent output parameters, while others represent some function or operation. The functions and operations may be performed by hardware circuits, software instructions executing on a processor, or some combination of hardware and software. Given the description herein, those skilled in the art would be able to implement the described functionality using various combinations of hardware and software. As such, implementation details of the functions described herein will not be described in detail as such implementation details would be readily known to one skilled in the art.

As is well known in the art, the signal receiver 206 (FIG. 2) outputs satellite coordinates 402 $X_i[j], Y_i[j], Z_i[j]$, measured pseudoranges 412, and full phases 414 during each epoch and for each of its received satellite signals. Matrix G is computed in block 404 using satellite channel weights generated by weight correction block 406 (described in further detail below) and the satellite coordinates 402 $X_i[j], Y_i[j], Z_i[j]$ and a priori rover coordinates. The computation of the matrix G is well known in the art, and consists of the following steps. First, the directional cosines matrix for the rover-satellite vector is computed. The reported satellite coordinates and a priori rover coordinates (which are gradually being made more precise) are used for this. The resulting matrix is supplemented with the unit matrix column and further designated as matrix $H_i[j]$. Next, the matrix of weights for all satellite channels $W_i[j]$ is computed. Satellite weight is determined by its elevation angle and takes into account the reported messages about satellite health. Next, matrix $G_i[j]$ is computed for the i-th epoch and j-th satellite using the following equation:

$$G_i[j] = (H_i[j]^T W_i[j]^{-1} H_i[j])^{-1} H_i[j]^T W_i[j]^{-1}$$

The rover's code coordinates $x_{ic}, y_{ic}, z_{ic}$ are computed in block 408 using the least squares method (LSM).

The satellites' carrier phase increments $d\Phi_i[j]$ are computed in block 410 using full phases $\phi_i[j]$ 414. Provided that phases are determined in cycles and wave length ($\lambda$) in meters, the carrier phase increments at the i-th epoch may be computed in block 410 as:

$$d\Phi_i[j] = (\phi_i[j] - \phi_{i-1}[j]) * \lambda.$$

Corrections 416 for troposphere, ionosphere and Earth rotation are applied to the i carrier-phase increments $d\Phi_i[j]$. Block 418 receives as input the satellite coordinates 402 $X_i[j], Y_i[j], Z_i[j]$, matrix $G_i$ from block 404, the rover's code coordinates $x_{ic}, y_{ic}, z_{ic}$ from block 408, and the satellites' carrier-phase increments $d\phi_i[j]$ from block 410. These inputs are processed in block 410 to generate $dx_i, dy_i, dz_i$, which are the increments of the rover's Cartesian coordinates from the (i−1)-th to i-th epochs.

Figure 5:
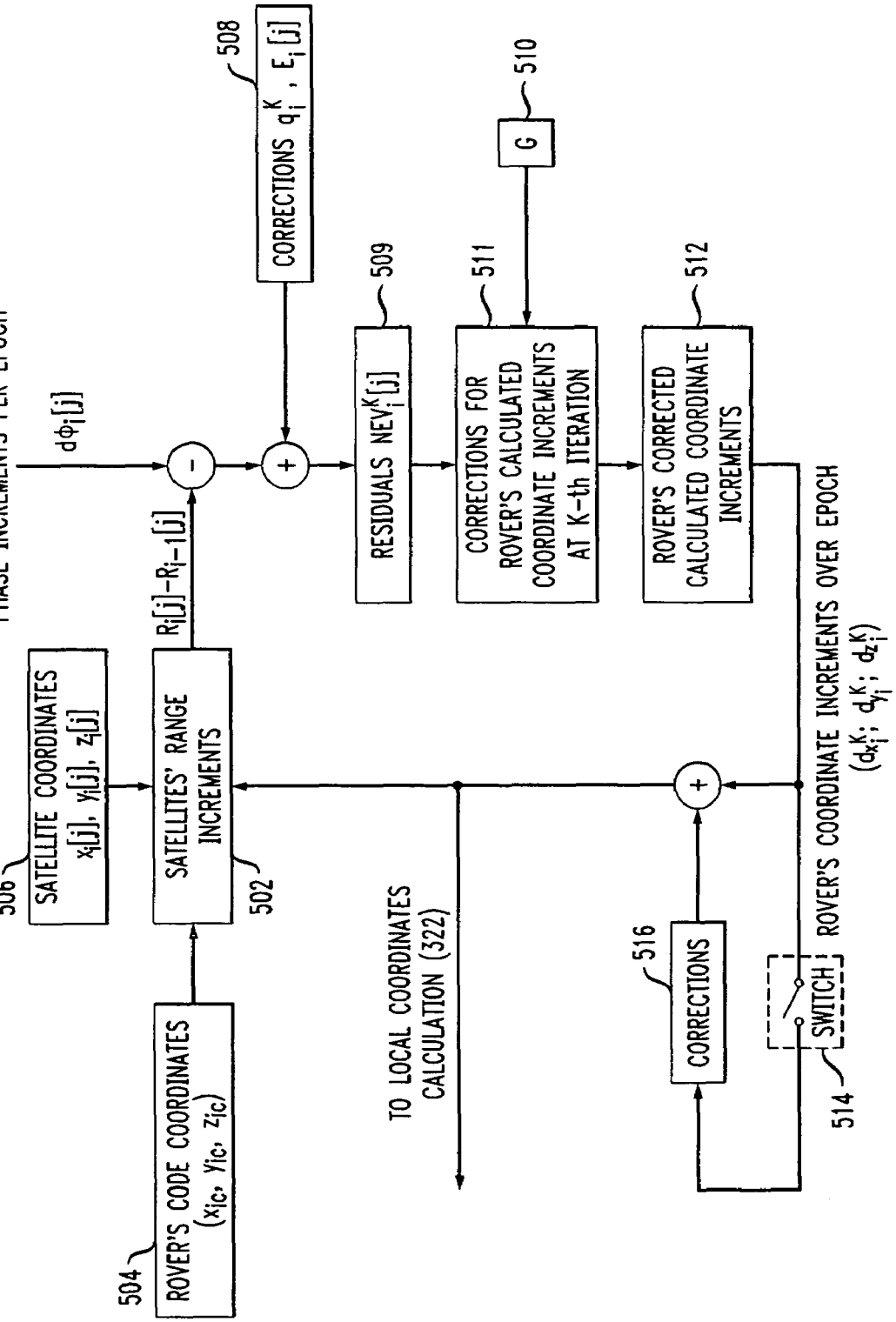
FIG. 5 shows a functional block diagram illustrating the algorithm for determining a rover navigation unit's coordinate increments using LSM over several iterations.

Further details of block 418 and the generation of the increments of the rover's Cartesian coordinates will now be described in further detail in conjunction with FIG. 5 which illustrates the algorithm for determining the rover's coordinate increments using LSM over several iterations. Satellite coordinates 506 $X_i[j], Y_i[j], Z_i[j]$ and the rover's code coordinates $x_{ic}, y_{ic}, z_{ic}$ 504 are provided to processing block 502 to be used in the computation of the satellite ranges for i-th and (i−1)-th epochs: $R_i[j], R_{i-1}[j]$. These ranges are computed as:

$$R_i[j] = ((X_i[j] - x_{ic})^2 + (Y_i[j] - y_{ic})^2 + (Z_i[j] - z_{ic})^2)^{0.5}$$

$$R_{i-1}^k[j] = ((X_{i-1}[j] - x_{ic} - dx_i^k)^2 + (Y_{i-1}[j] - y_{ic} - dy_i^k)^2 + (Z_{i-1}[j] - z_{ic} - dz_i^k)^2)^{0.5}$$

where $dx_i^k, dy_i^k, dz_i^k$ are the increments of the rover's coordinates at the k-th iteration (note that original increments of rover's coordinates may be considered equal to 0, and $k \geq 1$.) Corrections for the drift of the rover's clock at the k-th iteration ($q_i^k$) and corrections for Earth rotation $E_i[j]$ are represented as 508 and are computed as follows:

$$E_i[j] = C_e * (X_i[j] * dy_i^k + dX_i[j] * y_{ic} - Y_i[j] * dx_i^k - dY_i[j] * x_{ic}),$$

where $C_e = 2.432387791e-13$.

Residuals of increments $NEV_i^k[j]$ are then calculated in block 509 as a difference between measured and computed increments of radial pseudoranges as follows:

$$Nev_i^k[j] = d\Phi_i[j] - (R_i[j] - R_{i-1}^k[j]) + E_i[j] - q_i^k$$

Using matrix G 510 and the residuals of increments 509, corrections for the increments of the rover's coordinates and clock drift are calculated 511 using LSM as follows:

$$\Delta_i^k = G_i * Nev_i^k,$$

where $Nev_i^k$ is the N-dimensional vector of residuals increments at the k-th iteration, $\Delta_i^k$ is the four-dimensional vector of corrections for the three increments of rover's coordinates and clock drift with the following components $\Delta x_i^k, \Delta y_i^k, \Delta z_i^k, \Delta q_i^k$ at the k-th iteration; and $G_i$ is the transformation matrix for the LSM.

The rover's expected coordinate increments are corrected in block 512 as:

$$dx_i^k = dx_i^{k-1} + \Delta x_i^k$$

$$dy_i^k = dy_i^{k-1} + \Delta y_i^k$$

$$dz_i^k = dz_i^{k-1} + \Delta z_i^k$$

$$dq_i^k = dq_i^{k-1} + \Delta q_i^k$$

Absolute values of the corrections for coordinate increments are compared with a threshold. If a correction exceeds the threshold, a next iteration is carried out, k increments by one, and the algorithm goes back to block 502. If all of the corrections are below the threshold, then the iterations stop and the obtained values $dx_i^k, dy_i^k, dz_i^k$ are the measured increments of the rover's coordinates $dx_i, dy_i, dz_i$ as the first approximation.

The extrapolation correction is defined when the rover is stationary for a long enough time interval (at the marker point, for instance) and it is further applied. During stops the local coordinates do not change, the switch 514 is closed, and average measured coordinate increments are considered to be corrections 516. When the rover is moving, the switch 514 is opened and the correction 516 is applied to the measurement.

Returning now to FIG. 5, during operation, the rover may produce inaccurate satellite signal measurements due to certain abnormal errors. Such errors are detected by the indicator of anomalies block 420. According to one aspect of the invention, anomalous measurements are removed from computations by resetting weight coefficients of some of the satellites for specific epochs. Thus, the output of the indicator of anomalies is an input to weight correction block 406. More particularly, the weights at the epoch during which there was an anomalous measurement, as well as the following epoch, are set to 0. Further, matrices $G_i, G_{i+1}$ employed in the LSM are re-computed for i-th and (i+1)-th epochs. Further details of the indicator of anomalies block will be described in further detail below in conjunction with FIGS. 6 and 7.

After anomalous measurements have been eliminated, local coordinates $(x_i, y_i, z_i)$ of the moving rover are calculated in block 422. The local coordinates are calculated by successive summation of coordinate increments as follows:

$$x_i = x_{i-1} + dx_i, \; y_i = y_{i-1} + dy_i, \; z_i = z_{i-1} + dz_i.$$

The origin of the local coordinate system coincides with the rover's original position (at i=1 $x_1$=0, $y_1$=0, $z_1$=0).

If it is necessary, one can determine the coordinates of the origin ($x_0$ $y_0$ $z_0$) in the geocentric coordinate system. There are several ways of doing so. For example, code measurements may be used during stops of the rover at the starting point. Alternatively, the coordinates of the origin point may be found using RTK (or other geodetic techniques). The absolute coordinates of the moving rover may be obtained by adding the obtained local coordinates to the coordinates of the original point. The accuracy of such data will substantially depend on the accurate determination of the original coordinates.

In some cases these coordinates can be used in the procedure of determining local coordinates of the moving rover to compute expected ranges in block 402 by replacing $x_{ic}$, $y_{ic}$, $z_{ic}$ with ($x_0+x_i$), ($y_0+y_i$), ($z_0+z_i$) respectively.

With reference again to FIG. 1, in addition to generating local coordinates, the principles of the present invention may be used to determine the path length of the path $L_i$ traversed by the rover, the distance between two points $D_{AB}$ or $D_{BC}$ traversed by the rover, and the area $A_R$ enclosed by the trajectory may also be determined.

In order to measure a distance between two points A and B on the ground, the rover moves along a random trajectory from point A, which is the origin of the local coordinate system to point B. While moving, the receiver tracks the satellites and measures pseudoranges and full phases. Upon arrival at point B, the distance between the points $D_{AB}$ is calculated 424 (FIG. 4) as a modulo of the vector of point B local coordinates ($x_B$, $y_B$, $z_B$) as follows:

$$D_{AB} = (x_B^2 + y_B^2 + z_B^2)^{0.5}$$

In order to measure the length of a random trajectory (similar to the operation of an odometer), increments of the three coordinates for each i-th epoch and modulo $V_i$ of coordinate increments for the current epoch are computed. The length of trajectory ($L_i$) for i epochs is determined 423 (FIG. 4) by a successive summation of the magnitudes as follows:

$$V_i = (dx_i^2 + dy_i^2 + dz_i^2)^{0.5}$$

$$L_i = L_{i-1} + V_i, \text{ (at } i \geq 2)$$

$$L_1 = 0$$

It is important to take into account a sampling error which depends on the rover's trajectory and velocity. If the time interval between neighboring epochs is small enough, then the rover's motion is considered to be straight-line and the sampling error is minimal. If the rover stops from time to time, then the magnitudes of coordinate increments should not be added during stops in order not to accumulate errors.

In order to measure the area 428 (FIG. 4) of a site marked with reference points on the ground, the rover moves successively from one reference point to another, with local coordinates being determined. Upon returning to the starting reference point, an interpolation correction is applied to the measurements. The site area is divided into triangles which do not overlap each other and whose corners are reference points. The length of triangle sides is calculated by the fixed local coordinates of corners. Further, the area of each triangle is determined with the help of side lengths, and the areas obtained are added.

As described above, the indicator of anomalies 420 detects the epochs during which abnormal errors in full phase measurements occurred, and eliminates the measurements from those epochs. In performing this function, the indicator of anomalies 420 uses the redundancy of observed satellite signals. The indicator of anomalies 420 processes residuals of increments each epoch to isolate such satellites whose measurements contain an abnormal error. If one of the satellites (j-th) among the satellites of the constellation with N satellites (N>>1) has abnormal measurements, its residual $Nev_i^k$ [j] will exceed a threshold after completion of iterations. Hence, comparing magnitudes of residuals with the threshold one can isolate and eliminate a channel with anomalies by resetting its weight multiplier (i.e., making its weight multiplier equal to zero). In practice, the abnormal error in a channel can be so great that it affects the neighboring channels and the residuals of these channels will exceed the threshold as well. In this case we have to eliminate the two neighboring channels. To isolate the suspect channel, it would be reasonable to switch off all the channels in turn. However this would overload the processor, especially if the measurements are made in real time. A compromise is to switch off only one channel with the greatest residual. In most cases this will be a sufficient solution to guarantee that recomputed residuals shall be lower than the threshold for all the remaining channels. It is unlikely that his procedure would need to be repeated in order to eliminate another channel as the second approximation.

As the indicator of anomalies processes residuals of range increments, which are formed by two neighboring epochs, one has to consider the fact that the abnormal residual at i-th epoch has been caused by an abnormal full phase measurement at the same i-th epoch. But then the phase increment from i-th to (i+1)-th epoch is abnormal too even if at epoch (i+1) the phase was normal. Thus, if an anomaly is detected, the increment of radial range should be also eliminated for the following (i+1) epoch in the given channel.

Figure 6:
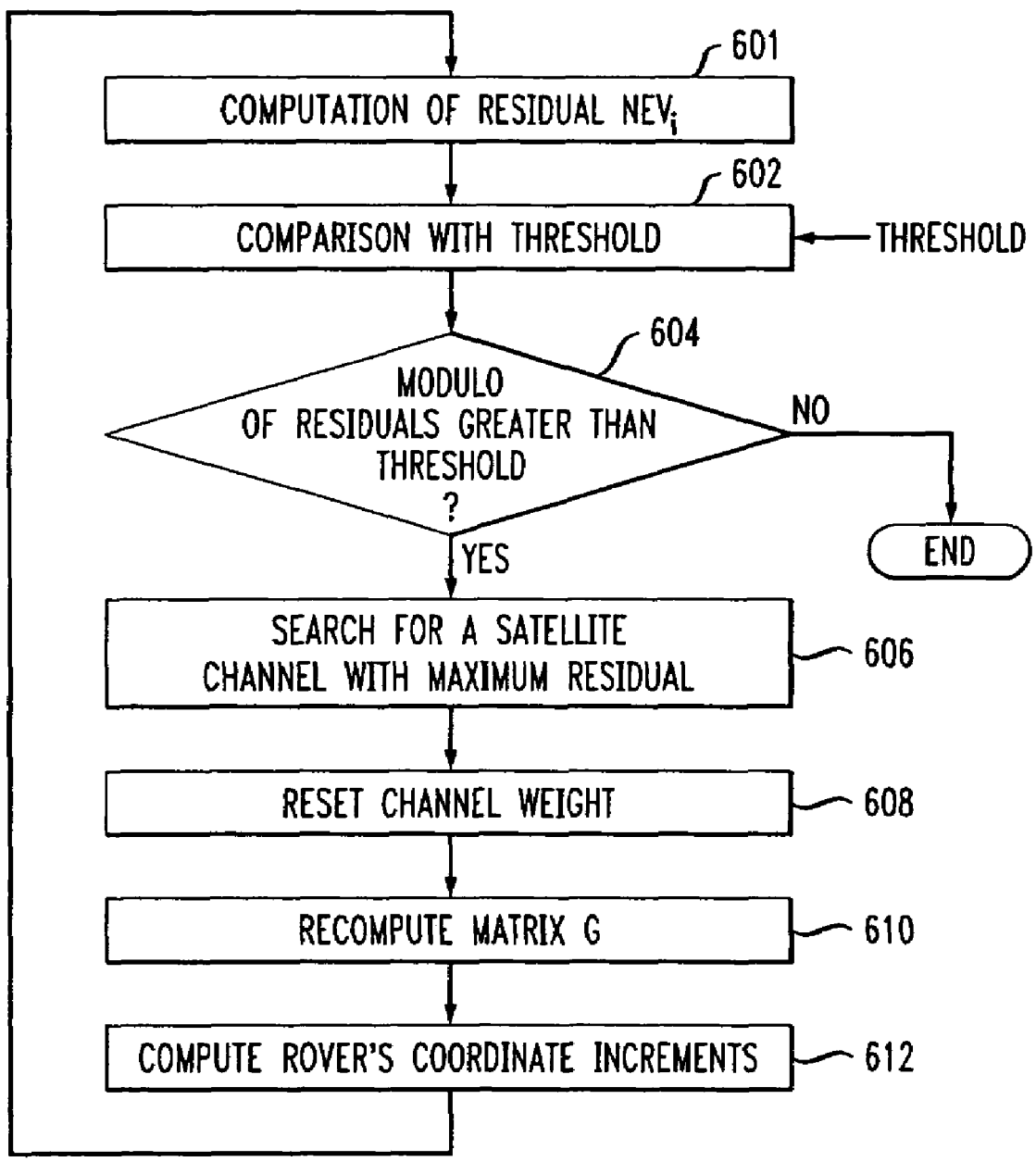
FIG. 6 is a flowchart showing the steps utilized by the indicator of anomalies in accordance with one embodiment.
Figure 7:
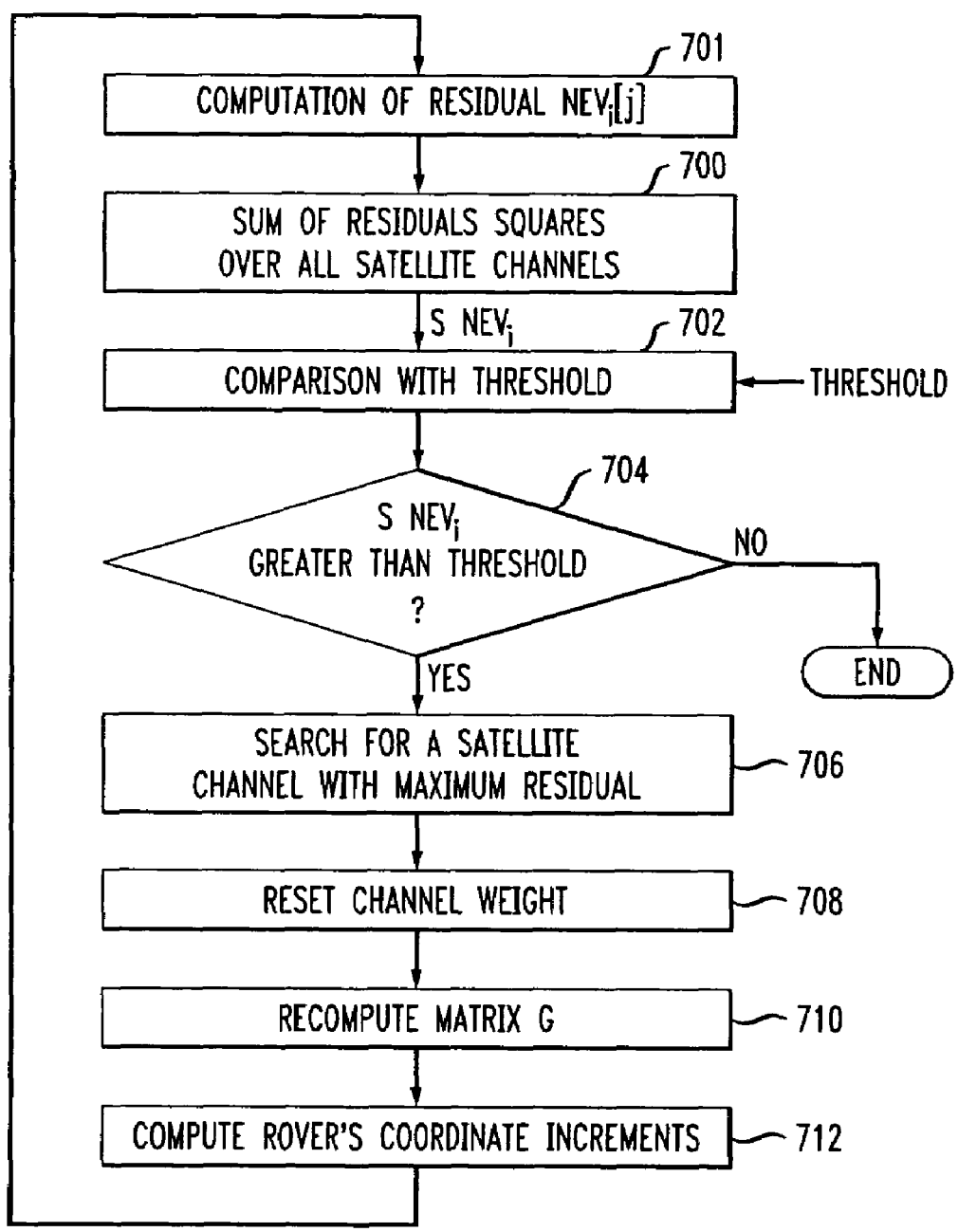
FIG. 7 is a flowchart showing the steps utilized by the indicator of anomalies in accordance with one embodiment.

We will now describe two embodiments of the indicator of anomalies 420 in conjunction with FIGS. 6 and 7.

The first embodiment is discussed in conjunction with the flowchart of FIG. 6. The algorithm computes residuals $NEV_i$ [j] in step 601 as described above in conjunction with processing block 509 (FIG. 5). In each satellite channel, the magnitudes of residuals (after completion of iterations) are compared to the threshold in step 602. If the threshold is not exceeded by the residual modulo of any channels (as determined in step 604) then the algorithm ends. If the threshold is exceeded by the residual modulo on at least one channel, then in step 606 a search is performed for the satellite channel with the maximum residual. In step 608 the channel weight for the current and following epoch is set to zero for the satellite channel identified in step 606. (In an alternate embodiment, the channel weight for only the current epoch is set to zero if the residual of the satellite channel identified in step 606 is below another defined threshold.) Matrix G is then recomputed in step 610 while eliminating the satellite channel identified in step 606. The rover's coordinate increments and residuals are computed in step 612 and step 601 respectively, and the steps of FIG. 6 are then repeated until either the residuals of all channels are less than the threshold, or the number of remaining channels becomes smaller than some predetermined allowable number (e.g., 5). If the steps are repeated until the number of remaining channels becomes smaller than the allowable number, then the epoch is considered inaccurate. In this case, the measurements of coordinate increments are not used for the epoch and are replaced with data obtained by the extrapolation of the increments from previous epochs (for the simplest case, they are replaced with the increments of the previous epoch).

The second embodiment is discussed in conjunction with the flowchart of FIG. 7. The algorithm computes residuals $NEV_i[j]$ in step 701 as described above in conjunction with processing block 509 (FIG. 5). In step 700, the sum of residuals squares (S $NEV_i$) over all satellite channels is computed. The sum of residuals squares is compared to the threshold in step 702. If the threshold is not exceeded (as determined in step 704) then the algorithm ends. If the threshold is exceeded, then in step 706 a search is performed for the satellite channel with the maximum residual. In step 708 the channel weight for the current and following epoch is set to zero for the satellite channel identified in step 706. (In an alternate embodiment, the channel weight for only the current epoch is set to zero if the residual of the satellite channel identified in step 706 is below another defined threshold.) Matrix G is then recomputed in step 710 while eliminating the satellite channel identified in step 706. The rover's coordinate increments and residuals are computed in step 712 and 701 respectively, and the steps of FIG. 7 are then repeated until the sum of all the residuals squares becomes smaller than the threshold. Again, if the steps are repeated until the number of remaining channels becomes smaller than the allowable number, then the epoch is considered inaccurate. In this case, the measurements of coordinate increments are not used for the epoch and are replaced with data obtained by the extrapolation of the increments from previous epochs (for the simplest case, they are replaced with the increments of the previous epoch).

The readings of the anomaly indicator 420, which analyzes increments of residuals, may also be combined with alarms of channel indicators 426 which also indicate a possible anomalous measurement in a satellite channel. Such alarms of channel indicators 426 may indicate anomalous measurements due to, for example, a sharp drop in signal amplitude or a large signal spike at the output of a PLL phase discriminator. Various techniques for detecting inaccurate measurements, which may be used as alarm channel indicators 426, are described in U.S. Pat. No. 6,861,979, entitled Method And Apparatus For Detecting Anomalous Measurements In A Satellite Navigation Receiver, which is incorporated herein by reference. There are different ways of combining the alarm of channel indicators 426 and the indicator of anomalies 420. For example, the signals of the anomaly indicator 420 and alarms 426 can be combined in series, that is, a suspected channel identified by the alarm signals of channel indicators 426 is eliminated, while the indicator of anomalies 420 works with the remaining channels. In parallel operation the indicator of anomalies 420 works with all the channels, and a channel which is identified as anomalous by both the indicator of anomalies 420 and the alarm of channel indicators 426, is eliminated. One skilled in the art will recognize that other combinations are also possible. For example, the alarm of channel indicators 426 and the indicator of anomalies 420 each identifies a least reliable channel, but final decision-making with respect to eliminating the identified channels may be based on some weighting algorithm, thus potentially giving greater weight to either the alarm of channel indicators 426 or the indicator of anomalies 420.

As shown in FIG. 4, the alarm signals of channel indicators 426 and the indicator of anomalies 420 generate alarm signals when an abnormal measurement arises in a satellite channel. These alarm signals may be provided to the rover's coordinate increments computation 418 and/or the weight correction 406 in order to improve the accuracy of calculations.

These alarm signals may be used in different ways in order to improve the accuracy of the calculations.

One way to use the alarm signals is to eliminate a measured carrier-phase increment in the satellite channel and epoch for which an alarm signal was generated. Using this technique, the goal is to eliminate from LSM processing those phase increments that could impair the rover coordinate calculations. This technique is based on the satellite redundancy in the constellation over a corresponding epoch. However, a decrease in the number of satellites reduces geometric dilution of precision (GDOP) and increases the error effects of the remaining satellites on the increment error of rover coordinates.

Another way to use the alarm signals is to eliminate the rover coordinate increment measured over the identified epoch and substitute the increment obtained by extrapolation of the previous epoch's measurements in determining local coordinates. This technique is based on the assumption that the parameters of the rover in motion are slowly changing. The goal is to remove the increments with abnormal errors from the sum of increments that define the local coordinates. This may be done by extrapolation, although the efficiency of this depends on the correlation of coordinate increments for neighboring epochs, i.e., the real model of the rover motion. Note that such a substitution might increase the resulting error.

One embodiment of an advantageous anomaly indicator, utilizing the above described parameters, is as follows. A review of satellite measurements indicates that during motion of the rover, interruptions in satellite measurements occur. These interruptions frequently occur with rising and setting satellites, but sometimes satellites at high elevation may become shaded by a local object as well. The carrier phase increments for these boundary epochs must be measured. However, the first calculated increment is very large and can distort indicator values. Therefore, the anomaly indicator should first consider the information about missing measurements according to channel indicators and then reset the weights of the satellites over the marked and following epochs. The following conditions are to be met for each epoch: 1) the average weighed residual is greater than one fourth of wavelength (around 5 cm); and 2) number of satellites (whose weight is non-zero) is greater than 5. If the two conditions are met, then a satellite (from the satellites in operation) is chosen whose modulo of residual is maximum and it is determined whether this modulo is greater than wavelength (about 20 cm). Then the weight of the corresponding channel is reset, matrix G is recalculated, and the procedure above is repeated until at least one of the two conditions is not satisfied. The average weighted residual is calculated as the square root of the sum, over all the operating satellites, of the residual square of each satellite channel multiplied by its weight coefficient. The weight coefficients are formed from satellite weights and are subject to normalization.

Since both satellites and the rover unit generally move smoothly, a large difference between carrier phase increments for neighboring epochs for a satellite may also indicate an anomalous measurement. This, characteristic (as well as others) may be used to detect and eliminate anomalous phase increments.

After all iterations are complete the following steps are performed. If the average weighed residual for this epoch is greater than ¼ wavelength (around 5 cm), the rover coordinate increment over the epoch is substituted for an extrapolated value, where the extrapolation is performed using two previous epochs. If the coordinate increment vector is denoted by $dX_i$ (it was calculated at i-th epoch), it is replaced by extrapolated value ($2dX_{i-1}+dX_{i-2}$).

There are further additional techniques which allow for increasing the accuracy of local coordinates. Various components contribute to the total budget of local coordinate errors, with each of these components having different origins and different statistical parameters. For example, certain errors are caused by slow changes of additional delays of the satellite signal and these errors can be processed by polynomial approximation over a considerable time interval. The cause of such delays can be related to slow changes in atmosphere, instability in receiver channels, etc. The additional delays, which do not change during the observation interval, never affect the accuracy of local coordinates. Nevertheless, the first derivative of the error—change rate of the additional delay—will result in increasing the errors in local coordinates.

It is possible to partially reduce the above mentioned error component if one starts measuring coordinate increments before the rover begins its motion. When the rover is stationary, the true coordinate increment is equal to zero. Thus, the error in measurements of coordinate increments can be extrapolated to the following movement interval and used as an extrapolation correction for coordinate increments. If the rover stops from time to time, then the extrapolation correction can change from one stop to another and can be determined by previously measured points considering the derivatives of higher orders. Such a technique may be used to improve the accuracy of the measured local coordinates in real time. The efficiency of the extrapolation correction depends on the weight of the slow changing delay among the other error components, the number and duration of stops, as well as the duration of motion intervals on which the extrapolation correction has been applied.

In some applications local coordinates are used not in real time, but in a post processing mode. If the rover passes over points with known coordinates, this information may be used to determine the interpolation correction. (It is noted that the local coordinate system point of origin must remain fixed during the rover's movement.) In particular, the rover moves along a loop and returns to the origin of the local coordinate system in some time. The difference between the measured local coordinates at the original point upon return and start is a final error of coordinate measurements. Dividing the final error by the number of elapsed epochs, one obtains an average error of coordinate increments which may be used as the correction for the measured coordinate increments for the motion interval. Local coordinates may then be re-computed with this correction. Similarly, the interpolation correction is determined when the rover passes by known points several times. In this case, either linear interpolation between neighboring points can be used or a correction in the form of a polynomial based on some points processed with the LSM can be applied.

It is also possible to measure local coordinates using two receivers in differential mode. Using a stationary Base receiver and a moving rover receiver, the local coordinates of the rover can be measured more accurately, both in real time and in post processing modes. It is necessary to have a communication link between the base and rover to make measurements in real time. Post processing mode allows co-processing of the recorded measurements of the base and rover. It is not necessary to know the precise coordinates of the base.

To form single differences of measured carrier phase increments, the increments of base carrier phases are subtracted from the increments of rover carrier phases respectively. Similarly, single differences are generated using the coordinates of satellites measured according to the local clock of the rover. The indicator of anomalies eliminates measurements of those satellites and epochs for which large errors were detected either at the base or the rover, or in the communication link between them.

Residuals of single differences increments may be obtained by subtracting expected single differences from measured ones and considering the clock drift. Utilizing the LSM procedure, similar to as described above, enables rover's coordinate increments and local coordinates to be determined on the basis of phase measurements in the differential mode, in which highly-correlated components of base and rover errors are eliminated.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining relative positions of a mobile unit, wherein said mobile unit moves from an initial location to a plurality of successive positions, said method comprising the steps of:
   receiving a plurality of signals from a corresponding plurality of navigation satellites and tracking carrier phases of said signals during movement;
   calculating carrier phase increments for each of said signals for each of a plurality of time epochs;
   determining which of said carrier phase increments are anomalous and eliminating them from further calculations;
   calculating coordinate increments for each of said plurality of time epochs using non-eliminated carrier phase increments; and
   summing said coordinate increments over a plurality of time epochs to determine a position of said mobile unit relative to said initial location.

2. The method of claim 1 wherein said step of calculating coordinate increments further comprises the steps of:
   generating a transformation matrix G using satellite coordinates for navigation satellites whose carrier phase increments were not determined to be anomalous; and
   calculating said coordinate increments using said transformation matrix G and a least squares method.

3. The method of claim 1 wherein said step of determining which of said carrier phase increments are anomalous further comprises the steps of:
   calculating residuals of carrier-phase increments; and
   comparing said residuals to a threshold.

4. The method of claim 3 wherein said step of eliminating anomalous carrier phase increments from further calculations further comprises the steps of:
   determining a maximum residual; and
   setting a channel weight for a satellite associated with said maximum residual to zero.

5. The method of claim 4 wherein said step of setting a channel weight for a satellite associated with said maximum residual to zero further comprises the step of:
   resetting said channel weight to zero during two consecutive epochs.

6. The method of claim 4 wherein said step of setting a channel weight for a satellite associated with said maximum residual to zero further comprises the step of:
resetting said channel weight to zero during one epoch.

7. The method of claim 1 wherein said step of determining which of said carrier phase increments are anomalous further comprises the steps of:
calculating residuals of carrier-phase increments;
calculating a sum of residuals squares; and
comparing said sum of residuals squares to a threshold.

8. The method of claim 7 wherein said step of eliminating anomalous carrier phase increments from further calculations further comprises the steps of:
determining a maximum residual; and
setting a channel weight for a satellite associated with said maximum residual to zero.

9. The method of claim 8 wherein said step of setting a channel weight for a satellite associated with said maximum residual to zero further comprises the step of:
resetting said channel weight to zero during two consecutive epochs.

10. The method of claim 8 wherein said step of setting a channel weight for a satellite associated with said maximum residual to zero further comprises the step of:
resetting said channel weight to zero during one epoch.

11. The method of claim 1 wherein said step of determining which of said carrier phase increments are anomalous further comprises the step of:
calculating an average weighted residual.

12. The method of claim 11 wherein said step of determining which of said carrier phase increments are anomalous further comprises the step of:
detecting a large difference between carrier phase increments for neighboring epochs.

13. The method of claim 1 further comprising the step of:
after said step of eliminating, determining whether the remaining number of carrier-phase increments is less than a threshold for a particular epoch; and
if the remaining number of carrier-phase increments is less than a threshold for a particular epoch, then extrapolating coordinate increments for said particular epoch using data from prior epochs.

14. The method of claim 1 wherein said step of determining which of said carrier phase increments are anomalous is based at least in part on alarm signals of satellite channel indicators.

15. The method of claim 1 further comprising the step of:
using coordinate increments calculated during a period of time when said mobile unit is stationary as a correction extrapolation during later periods of time when said mobile unit is moving.

16. The method of claim 1 wherein, during a motion interval, said mobile unit traverses a closed loop and returns to said initial location, said method further comprising the steps of:
determining a starting position of said mobile unit at said initial position prior to said traversal;
determining a finishing position of said mobile unit when it returns to said initial location after said traversal; and
calculating the difference between said finishing position and said starting position; and
using said difference as an error of calculated coordinate increments.

17. The method of claim 16 wherein said step of using said difference as an error of calculated coordinate increments further comprises the steps of:
dividing said difference by a number of elapsed epochs to determine an average error of coordinate increments; and
using said average error of coordinate increments as a correction for measured coordinate increments during said motion interval.

18. The method of claim 1 further comprising the step of:
receiving data from a base station via a communication channel;
wherein said step of calculating coordinate increments is further based upon said received data from said base station utilizing differential processing mode so that highly correlated components of base and rover errors are eliminated.

19. A mobile unit comprising:
means for receiving a plurality of signals from a corresponding plurality of navigation satellites and tracking carrier phases of said signals during movement;
means for calculating carrier phase increments for each of said signals for each of a plurality of time epochs;
means for determining which of said carrier phase increments are anomalous and eliminating them from further calculations;
means for calculating coordinate increments for each of said plurality of time epochs using non-eliminated carrier phase increments; and
means for summing said coordinate increments over a plurality of time epochs to determine a position of said mobile unit relative to said initial location.

20. The mobile unit of claim 19 wherein said means for calculating coordinate increments further comprises:
means for generating a transformation matrix G using satellite coordinates for navigation satellites whose carrier phase increments were not determined to be anomalous; and
means for calculating said coordinate increments using said transformation matrix G and a least squares method.

21. The mobile unit of claim 19 wherein said means for determining which of said carrier phase increments are anomalous further comprises:
means for calculating residuals of carrier-phase increments; and
means for comparing said residuals to a threshold.

22. The mobile unit of claim 21 wherein said means for eliminating anomalous carrier phase increments from further calculations further comprises:
means for determining the maximum residual; and
means for setting a channel weight for a satellite associated with said maximum residual to zero.

23. The mobile unit of claim 22 wherein said means for setting a channel weight for a satellite associated with said maximum residual to zero further comprises:
means for resetting said channel weight to zero during two consecutive epochs.

24. The mobile unit of claim 22 wherein said means for setting a channel weight for a satellite associated with said maximum residual to zero further comprises:
means for resetting said channel weight to zero during one epoch.

25. The mobile unit of claim 19 wherein said means for determining which of said carrier phase increments are anomalous further comprises:
means for calculating residuals of carrier-phase increments;
means for calculating a sum of residuals squares; and
means for comparing said sum of residuals squares to a threshold.

26. The mobile unit of claim 25 wherein said means for eliminating anomalous carrier phase increments from further calculations further comprises:
   means for determining a maximum residual; and
   means for setting a channel weight for a satellite associated with said maximum residual to zero.

27. The mobile unit of claim 26 wherein said means for setting a channel weight for a satellite associated with said maximum residual to zero further comprises:
   means for resetting said channel weight to zero during two consecutive epochs.

28. The mobile unit of claim 26 wherein said means for setting a channel weight for a satellite associated with said maximum residual to zero further comprises:
   means for resetting said channel weight to zero during one epoch.

29. The mobile unit of claim 19 wherein said means for determining which of said carrier phase increments are anomalous further comprises:
   means for calculating an average weighted residual.

30. The mobile unit of claim 19 wherein said means for determining which of said carrier phase increments are anomalous further comprises:
   means for detecting a large difference between carrier phase increments for neighboring epochs.

31. The mobile unit of claim 19 further comprising:
   means for using coordinate increments calculated during a period of time when said mobile unit is stationary as a correction extrapolation during later periods of time when said mobile unit is moving.

32. The mobile unit of claim 19 further comprising:
   means for determining a starting position of said mobile unit at an initial position prior to a traversal;
   means for determining a finishing position of said mobile unit when it returns to said initial location after said traversal; and
   means for calculating the difference between said finishing position and said starting position; and
   means for using said difference as an error of calculated coordinate increments.

33. The mobile unit of claim 32 wherein said means for using said difference as an error of calculated coordinate increments further comprises:
   means for dividing said difference by a number of elapsed epochs to determine an average error of coordinate increments; and
   means for using said average error of coordinate increments as a correction for measured coordinate increments during said motion interval.

* * * * *